United States Patent
Deslauriers

(10) Patent No.: US 12,527,954 B2
(45) Date of Patent: Jan. 20, 2026

(54) METHOD AND SYSTEM FOR APPLYING TUMOR TREATING FIELDS INTERFACING WITH HAIR FOLLICLES

(71) Applicant: Novocure GmbH, Root (CH)

(72) Inventor: Richard Deslauriers, Woodbury, CT (US)

(73) Assignee: Novocure GmbH, Baar (CH)

( * ) Notice: Subject to any disclaimer, the term of this patent is extended or adjusted under 35 U.S.C. 154(b) by 490 days.

(21) Appl. No.: 17/937,100

(22) Filed: Sep. 30, 2022

(65) Prior Publication Data

US 2023/0102915 A1    Mar. 30, 2023

Related U.S. Application Data

(60) Provisional application No. 63/250,366, filed on Sep. 30, 2021.

(51) Int. Cl.
*A61N 1/00*    (2006.01)
*A61N 1/04*    (2006.01)
*A61N 1/36*    (2006.01)
*A61N 1/40*    (2006.01)

(52) U.S. Cl.
CPC ....... *A61N 1/36002* (2017.08); *A61N 1/0476* (2013.01); *A61N 1/0496* (2013.01); *A61N 1/3603* (2017.08); *A61N 1/40* (2013.01)

(58) Field of Classification Search
None
See application file for complete search history.

(56) References Cited

U.S. PATENT DOCUMENTS

| | | | | |
|---|---|---|---|---|
| 3,469,577 | A * | 9/1969 | Kater | A61B 5/291 600/397 |
| 8,170,684 | B2 * | 5/2012 | Palti | A61N 1/0492 607/152 |
| 2017/0224990 | A1 | 8/2017 | Goldwasser et al. | |
| 2017/0246468 | A1 | 8/2017 | Kalghatgi et al. | |
| 2021/0220640 | A1 | 7/2021 | Deslauriers | |

FOREIGN PATENT DOCUMENTS

| | | | | |
|---|---|---|---|---|
| KR | 20000059061 | * | 10/2000 | ............... A61N 1/06 |
| KR | 20000059061 A | * | 10/2000 | ........... A61H 23/008 |
| WO | WO2015/142764 A1 | | 9/2015 | |

OTHER PUBLICATIONS

European Patent Office acting as the International Search Authority; International Search Report and Written Opinion regarding PCT/IB2022/059371; dated Dec. 14, 2022.

* cited by examiner

*Primary Examiner* — Niketa Patel
*Assistant Examiner* — Anant A Gupta
(74) *Attorney, Agent, or Firm* — Dunlap Codding, P.C.

(57) ABSTRACT

A system and method for delivering TTFields are herein described. The system comprises an electric field generator generating a signal having a frequency from 50 kHz to 1 MHz and coupled to a lead. A pad is coupled to the lead and includes a solid continuous phase material and a conductive gel. The solid continuous phase material receives the signal from the lead, has a skin-facing surface, and is constructed of a conductive material or has a conductive material attached to, absorbed into, or adsorbed onto the solid continuous phase material. Pockets intersect the skin-facing surface, the pockets sized and dimensioned to receive a hair shaft. The conductive gel is attached to, absorbed into, or adsorbed onto the skin-facing surface and positioned within some of the pockets.

20 Claims, 4 Drawing Sheets

METHOD AND SYSTEM FOR APPLYING TUMOR TREATING FIELDS INTERFACING WITH HAIR FOLLICLES

CROSS REFERENCE TO RELATED APPLICATIONS/INCORPORATION BY REFERENCE STATEMENT

This non-provisional application claims the benefit of U.S. Provisional Application No. 63/250,366, filed on Sep. 30, 2021. The entire content of the above-referenced application is hereby expressly incorporated herein by reference in its entirety.

BACKGROUND

Tumor Treating Fields (TTFields or TTFs) are low intensity (e.g., 1-3 V/cm) alternating electric fields within the intermediate frequency range (e.g., 50 kHz to 1 MHz) that target solid tumors by disrupting mitosis. This non-invasive treatment targets solid tumors and is described, for example, in U.S. Pat. Nos. 7,016,725; 7,089,054; 7,333,852; 7,565,205; 8,244,345; 8,715,203; 8,764,675; 10,188,851; and 10,441,776. TTFields are typically delivered through two pairs of transducer arrays that generate perpendicular fields within the treated tumor; the transducer arrays that make up each of these pairs are positioned on opposite sides of the body part that is being treated. More specifically, for the OPTUNE® system, one pair of electrodes of the transducer array is located to the left and right (LR) of the tumor, and the other pair of electrodes of the transducer array is located anterior and posterior (AP) to the tumor. TTFields are approved for the treatment of glioblastoma multiforme (GBM), and may be delivered, for example, via the OPTUNE® system (Novocure Limited, St. Helier, Jersey), which includes transducer arrays placed on the patient's shaved head. More recently, TTFields therapy has been approved as a combination therapy with chemotherapy for malignant pleural mesothelioma (MPM) and may find use in treating tumors in other parts of the body.

Each transducer array used for the delivery of TTFields in the OPTUNE® device comprises a set of non-conductive ceramic disk electrodes, which are coupled to the patient's skin (such as, but not limited to, the patient's shaved head for treatment of GBM) through a layer of conductive medical gel. To form the ceramic disk electrodes, a conductive layer is formed on a top surface of nonconductive ceramic material. A bottom surface of the nonconductive ceramic material is coupled to the conductive medical gel. The nonconductive ceramic material is a safety feature to ensure that direct-current signals are blocked from unintentionally being transmitted to the patient by mistake.

One approach to applying the TTField in different directions is to apply the field between a first set of electrodes for a period of time, then applying a field between a second set of electrodes for a period of time, then repeating that cycle for an extended duration (e.g., over a period of days or weeks).

In order to generate the TTFields, current is applied to each electrode of the transducer array. The application of current over a period of time causes each electrode to warm and some of the electrodes may eventually become hot, and thus may become uncomfortable or painful to the patient. In order to maintain the desired temperature of the transducer array, the current applied is generally lowered, resulting in a weaker TTField, or the transducer array is powered off, thus shortening the duration of treatment. Additionally, the prior art teaches electrodes made from rigid and/or inflexible materials, such as ceramics, which do not contour to the patient.

Because of this heating of the transducer array, new and improved array assemblies that reduce the temperature of the transducer array while generating a more powerful TTField are desired. It is to such assemblies and methods of producing and using the same, that the present disclosure is directed.

SUMMARY OF THE DISCLOSURE

The problem of reducing the temperature of the transducer array while generating a more powerful TTField is solved by utilizing a pad receiving TTSignals and generating a TTField, as described herein. The pad has a solid continuous phase material and a conductive gel element, the solid continuous phase material receiving the electrical signal from a first conductive lead, the solid continuous phase material being at least one of constructed of a conductive material or having a conductive material attached, absorbed, or adsorbed to the solid continuous phase material, the solid continuous phase material having a skin-facing surface, and defining a plurality of pockets intersecting the skin-facing surface, at least some of the pockets being present on the skin-facing surface and sized and dimensioned to receive at least one hair shaft extending from the body of the subject, the conductive gel element being attached, absorbed, or adsorbed on the skin-facing surface of the solid continuous phase material and positioned within at least some of the pockets.

When the pads are applied to the skin of the patient, and the electrical signal having a frequency, a current, and a voltage, the frequency in a range of about 50 kHz to about 1 MHz, is supplied to the pad, a TTField is applied to the subject and current flows between the first pad and the second pad. In this instance, impedance between the first pad and the second pad is due to the electrical connection of the first pad and the second pad to the patient, and also due to the patient's body.

Conventionally, the electric field generator sends an electric signal at a maximum power, and the first and second pads are intended to be continuously worn by the patient for 2-4 days before removal for hygienic care and re-shaving (if necessary), followed by reapplication with a new set of arrays. In this time period, the subject's hair can grow and push the conventional electrode arrays away from the subject's skin and the subject's skin may produce oils thereby increasing impedance in the electrical connection between the conventional electrode arrays and the patient's skin. This increase in impedance can increase the temperature of the conventional electrode arrays and may require a reduction in the TTFields applied to the patient.

However, when the pad described herein is applied to the skin of the patient, the pockets receive the subject's hair, i.e., hair shafts, thereby reducing the likelihood that the pad will be pushed away from the patient's skin as the hair shafts grow. Maintaining the pad in closer contact with the patient's skin avoids the increase in the impedance between the pad and the patient's body, thereby reducing heating caused by the electrical current. Further, the hair shafts are surrounded and engaged by the conductive gel element positioned within at least some of the pockets. This enhances the electrical connection between the pad and the patient's skin, thereby permitting a more powerful TTField to be applied to the subject while maintaining the pad at a lower temperature.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Figure 1:
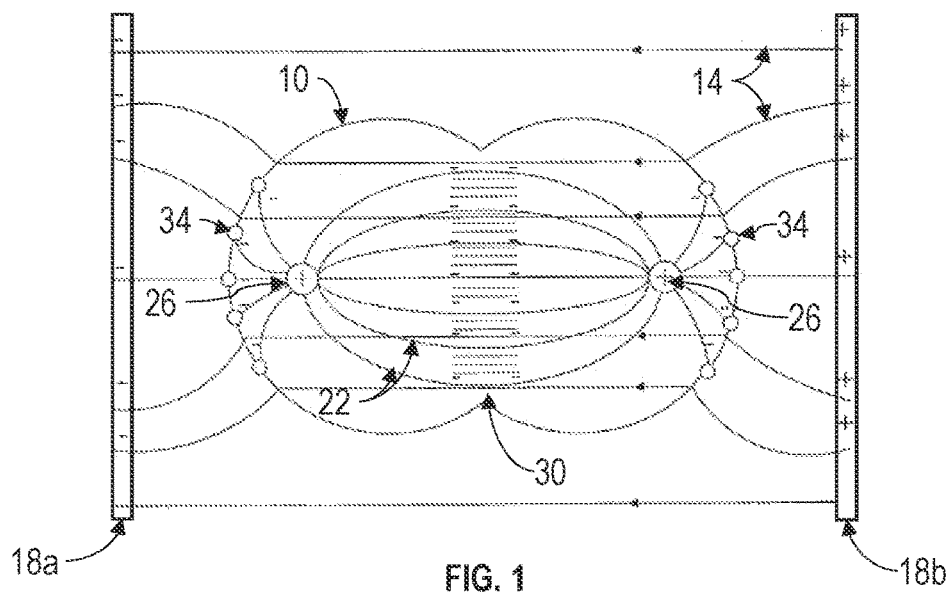
FIG. 1 is an exemplary embodiment of a schematic diagram of electrodes as applied to living tissue.

As utilized in accordance with the present disclosure, the following terms, unless otherwise indicated, shall be understood to have the following meanings:

The use of the term "a" or "an" when used in conjunction with the term "comprising" in the claims and/or the specification may mean "one," but it is also consistent with the meaning of "one or more," "at least one," and "one or more than one." As such, the terms "a," "an," and "the" include plural referents unless the context clearly indicates otherwise.

The use of the term "at least one" will be understood to include one as well as any quantity more than one. In addition, the use of the term "at least one of X, Y, and Z" will be understood to include X alone, Y alone, and Z alone, as well as any combination of X, Y, and Z. The use of ordinal number terminology (e.g., "first," "second," "third," "fourth," etc.) is solely for the purpose of differentiating between two or more items and is not meant to imply any sequence or order or importance to one item over another or any order of addition, for example.

The use of the term "or" in the claims is used to mean an inclusive "and/or" unless explicitly indicated to refer to alternatives only or unless the alternatives are mutually exclusive. For example, a condition "A or B" is satisfied by any of the following: A is true (or present) and B is false (or not present), A is false (or not present) and B is true (or present), and both A and B are true (or present).

As used herein, any reference to "one embodiment," "an embodiment," "some embodiments," "one example," "for example," or "an example" means that a particular element, feature, structure, or characteristic described in connection with the embodiment is included in at least one embodiment.

Throughout this application, the term "about" is used to indicate that a value includes the inherent variation of error for a composition/apparatus/device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements or method steps.

As used herein, the term "patient" is used interchangeably with the term "subject" and will be understood to include human and veterinary subjects. "Mammal" for purposes of treatment refers to any animal classified as a mammal, including (but not limited to) humans, domestic and farm animals, nonhuman primates, and any other animal that has mammary tissue.

Circuitry, as used herein, may be analog and/or digital components, or one or more suitably programmed processors (e.g., microprocessors) and associated hardware and software, or hardwired logic. Also, "components" may perform one or more functions.

As used herein, the term TTField (TTFields, or TTF(s)) refers to low intensity (e.g., 1-4 V/cm) alternating electric fields of medium frequencies (about 50 kHz-1 MHz, and more preferably from about 100 kHz-300 kHz) that when applied to a conductive medium, such as a human body, via electrodes may be used, for example, to treat tumors as described in U.S. Pat. Nos. 7,016,725, 7,089,054, 7,333,852, 7,565,205, 7,805,201, and 8,244,345 by Palti (each of which is incorporated herein by reference) and in a publication by Kirson (see Eilon D. Kirson, et al., Disruption of Cancer Cell Replication by Alternating Electric Fields, Cancer Res. 2004 64:3288-3295).

As used herein, the term TTSignal is an electrical signal that, when received by electrodes applied to a conductive medium, such as a human body, causes the electrodes to generate the TTField described above. The TTSignal is often an AC electrical signal.

As used herein, the term "pad" refers to one or more conductive materials that is/are configured to be placed over a part of a body of a subject to generate a TTField upon receiving TTSignals from an electric field generator.

Referring now to the drawings and in particular to FIG. 1, shown therein is a diagram of an exemplary embodiment of a dividing cell 10, under the influence of external TTFields, generally indicated as lines 14, generated by a first electrode 18a having a negative charge and a second electrode 18b having a positive charge. Further shown are microtubules 22 that are known to have a very strong dipole moment. This strong polarization makes the microtubules 22, as well as other polar macromolecules and especially those that have a specific orientation within the cell 10 or its surroundings, susceptible to electric fields. The positive charges of the microtubules 22 are located at two centrioles 26 while two sets of negative poles are at a center 30 of the dividing cell 10 and point of attachment 34 of the microtubules 22 to the cell membrane. The locations of the charges form sets of double dipoles and therefore are susceptible to electric fields of differing directions. In one embodiment, the cells go through electroporation, that is, DNA or chromosomes are introduced into the cells using a pulse of electricity to briefly open pores in the cell membranes.

Figure 2:
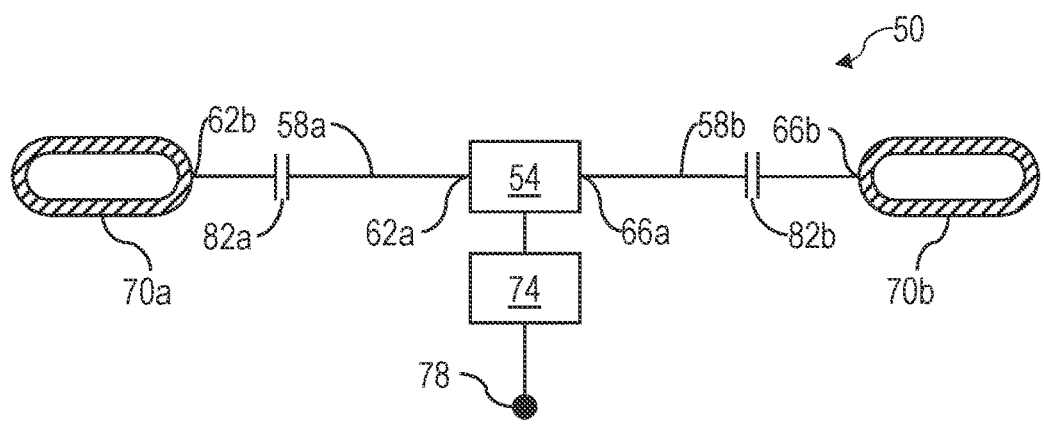
FIG. 2 is an exemplary embodiment of an electronic device configured to generate a TTField constructed in accordance with the present disclosure.

Turning now to FIG. 2, the TTFields described above that have been found to advantageously destroy tumor cells may be generated by an apparatus 50 (referred to hereinafter as apparatus 50). FIG. 2 is a schematic diagram of the apparatus 50 illustrating major components thereof. The apparatus 50 includes an electric field generator 54 and a pair of conductive leads 58, including first conductive lead 58a and second conductive lead 58b. The first conductive lead 58a includes a first end 62a and a second end 62b. The second conductive lead 58b includes a first end 66a and a second end 66b. The first end 62a of the first conductive lead 58a is conductively attached to the electric field generator 54 and the first end 66a of the second conductive lead 58b is conductively attached to the electric field generator 54. The electric field generator 54 generates desirable electric signals (i.e., TTSignals) in the shape of waveforms or trains of pulses as an output. The second end 62b of the first conductive lead 58a is connected to a pad 70a and the second end 66b of the second conductive lead 58b is connected to a pad 70b, each pad being supplied with the electric signals (e.g., TTSignals, wave forms). The pad 70a and the pad 70b, being provided with the electric signals, generates an electric field between the pad 70a and the pad 70b. The electric field (i.e., TTField), has a frequency and an amplitude.

Optionally, a skin-contact layer may be disposed between (1) the pad 70a and the patient and (2) the pad 70b and the patient in any of the embodiments described herein. The skin-contact layer helps to adhere/affix the pad 70a and the pad 70b to the patient, provides a conductive pathway for the electric fields to pass between the pads 70a and 70b and the patient through an intervening non-conductive or conductive layer, and is biocompatible. Examples of skin-contact layers include hydrogel as well as carbon conductive adhesive composites. The latter adhesives may comprise conductive particles, such as, for example, carbon black powder or carbon fibers, etc.

While the apparatus 50 shown in FIG. 2 comprises only two pads 70 (the pad 70a and the pad 70b), in some embodiments, the apparatus 50 may comprise more than two pads 70.

The electric field generator 54 generates an alternating voltage wave form at frequencies in the range from about 50 kHz to about 1 MHz (preferably from about 100 kHz to about 300 kHz) (i.e., the TTFields). The required voltages are such that an electric field intensity in tissue within the treatment area is in the range of about 0.1 V/cm to about 10 V/cm. To achieve this field, the potential difference between the first electrode 18a and the second electrode 18b (e.g., the electrode layer 162 described in detail below) in each of the pad 70a and/or the pad 70b is determined by the relative impedances of the subject's body and the connection between the pad 70a, the pad 70b and the subject's body.

In certain particular (but non-limiting) embodiments, the pad 70a and the pad 70b generate an alternating electric field within a target region of a patient. The target region typically comprises at least one tumor, and the generation of the alternating electric field selectively destroys or inhibits growth of the tumor.

The pair of pads 70a and 70b, as described herein, are externally applied to a patient, that is, are generally applied to the patient's skin and may be in an area devoid of a wound so that the pads 70a and 70b do not cover the wound, in order to apply the electric field (TTField) thereby generating current within the patient's tissue. Generally, the pair of pads 70a and 70b are placed on the patient's skin by a user such that the electric field is generated across patient tissue within a treatment area. TTFields that are applied externally can be of a local type or widely distributed type, for example, one of the pads 70a or 70b can cover a skin tumor or lesion to assist in the treatment of the skin tumor or lesion close to the skin surface.

In one embodiment, the user may be a medical professional, such as a doctor, nurse, therapist, or other person acting under the instruction of a doctor, nurse, or therapist, or the patient.

Optionally, the apparatus 50 includes a control box 74 and a temperature sensor 78 coupled to the control box 74, which are included to control the amplitude of the electric field so as not to generate excessive heating in the treatment area. When the control box 74 and the temperature sensor 78 are included, the control box 74 controls the output of the electric field generator 54 to maintain the temperature of the pads 70a and 70b below a comfortability threshold. In one embodiment, the comfortability threshold is a temperature at or about 40 degrees Celsius. In one embodiment, the comfortability threshold is a temperature of between about 39 degrees Celsius and 42 degrees Celsius, or a specific selected temperature between about 39 degrees Celsius and 42 degrees Celsius, such as, for example, 41 degrees Celsius.

The conductive leads 58 are standard isolated conductors with a flexible metal shield, preferably grounded thereby preventing spread of any electric field generated by the conductive leads 58.

In one embodiment, to protect the patient from any current due to DC voltage or DC offset voltage passing through the patient, leads 58a and 58b may include a DC blocking component, such as blocking capacitor 82a and blocking capacitor 82b, to block DC current from passing to the pad 70a and the pad 70b. Exemplary configurations and construction of the DC blocking component are described in more detail in U.S. Patent Publication 2021/0346693 A1 filed on May 6, 2021 entitled "CONDUCTIVE PAD GENERATING TUMOR TREATING FIELD AND METHODS OF PRODUCTION AND USE THEREOF", the entire contents of which are hereby incorporated herein in their entirety.

Figure 3:
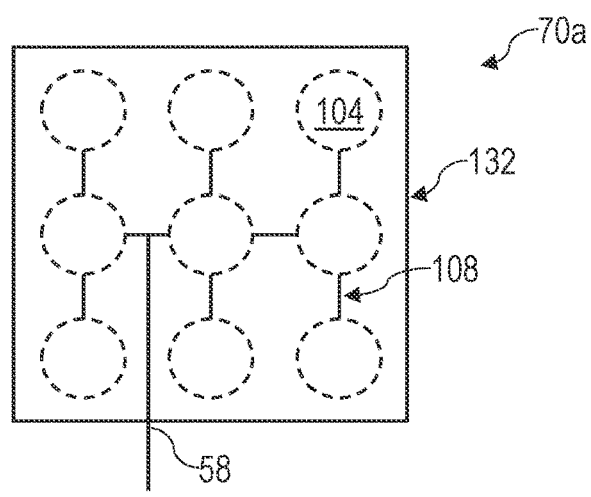
FIG. 3 is a block diagram of an exemplary embodiment of a pad constructed in accordance with the present disclosure.

Referring now to FIG. 3, shown therein is a diagram of an exemplary embodiment of the pad 70a constructed in accordance with the present disclosure, and shown in the context of FIG. 2 with conductive lead 58. The pad 70b may be similar in construction and function as the pad 70a. For this reason, only the pad 70a will be described herein for purposes of brevity. As shown in FIG. 3, the pad 70a is configured as a set of one or more electrode elements 104. Pad 70a may utilize electrode elements 104 that are capacitively coupled. In the example shown in FIG. 3, the pad 70a is configured as multiple electrode elements 104 (for example, about 2 cm in diameter) that are interconnected via flex wires 108. Each electrode element 104 may include a ceramic disk and an electrode layer (described below with respect to FIG. 5). In one embodiment, the pad 70a includes an outer peripheral edge 132.

Alternative constructions for the pad 70a may be used, including, for example, electrode elements 104 that are disc-shaped and electrode elements 104 that are not disc-shaped. The pads 70 may utilize electrode elements 104 that are not capacitively coupled. In this situation, each electrode element 104 of the pad 70a would be implemented using a region of a conductive material 146, a solid continuous phase material (hereinafter material 146, see FIG. 4) that is configured for placement against a person's body, with no insulating dielectric layer disposed between the electrode elements 104 and the body. Optionally, the gel layer 148 (see FIG. 4) may be disposed between the pad 70a and the person's body in any of the embodiments described herein.

In one embodiment, the pad 70a may be constructed in accordance with any pad or transducer array disclosed in U.S. application Ser. No. 17/813,837 filed Jul. 20, 2022 entitled "CONDUCTIVE PAD GENERATING TUMOR TREATING FIELD AND METHODS OF PRODUCTION AND USE THEREOF", the entire contents of which are hereby incorporated herein in their entirety.

The material 146 may be any material that is sufficiently porous so as to define a plurality of pockets 150 (see FIG. 11) in the material 146 (e.g., a foam, a woven or non-woven fabric, a pad, a sponge, a film, a fiber, or a membrane), at least some of the pockets being sized and dimensioned to receive at least one hair shaft extending from the body of the subject. At least one of the pockets 150 may have a largest cross-sectional distance in a range from 17 micrometers to 2 millimeters, and at least one of the pockets 150 may have a cross-sectional distance greater than 2 millimeters. In one embodiment, each pocket 150 has a diameter of between about 2-3 millimeters. In some embodiments, one or more pocket 150 has a diameter greater than 3 millimeters.

The material 146 may include a skin-facing surface 156 (see FIG. 4, FIG. 11) disposed towards the patient's skin when the pad 70a is in use. The pockets 150 may intersect the skin-facing surface 156, and at least some of the pockets 150 may be present on the skin-facing surface 156. One or more portion of the skin-facing surface 156 may contact the patient's skin.

The material 146 may be constructed of a conductive material. Alternatively, the material 146 may have a conductive material attached, absorbed, or adsorbed to the material 146. In one embodiment, the conductive material is selected from one or more of silver, copper, tin, aluminum, titanium, platinum, carbon, an alloy thereof, and/or some combination thereof.

Figure 4:
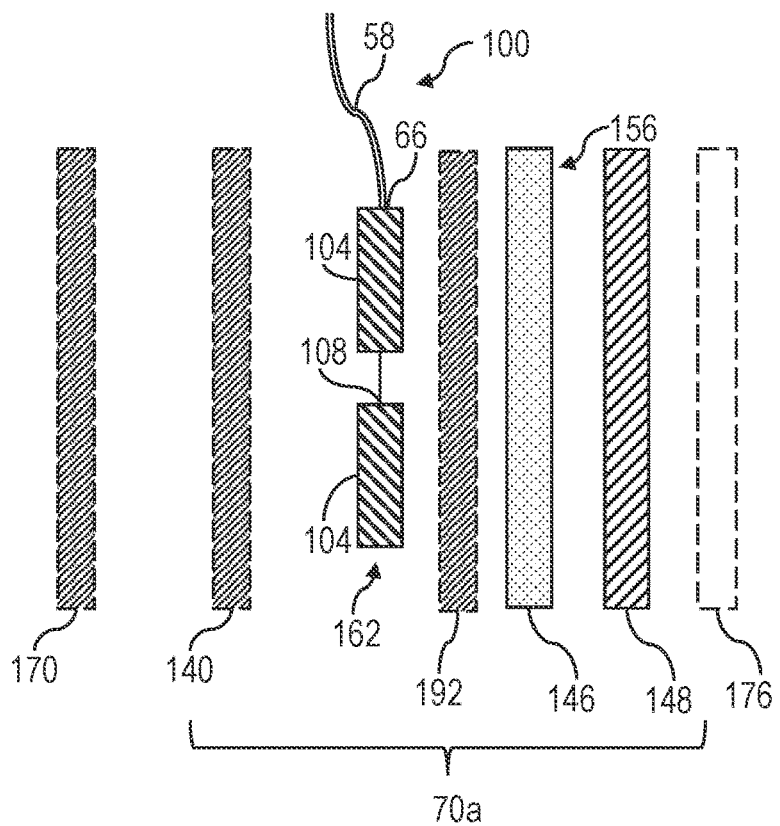
FIG. 4 is a cross-sectional view of an exemplary embodiment of a pad constructed in accordance with the present disclosure.

Referring now to FIG. 4, shown therein is a cross section of an exemplary embodiment of an extended pad 100 constructed in accordance with the present disclosure. The extended pad 100 comprises the pad 70a and a compression layer 170, and, optionally, a removable protection layer 176 (e.g., a release liner). The pad 70a generally comprises one or more layer, including the material 146, a gel layer 148, an electrode layer 162, and the durable topcoat layer 140. In some embodiments, the pad 70a includes a dielectric layer 192 disposed between the electrode layer 162 and the gel layer 148. FIG. 4 also shows the second end 66 of the conductive lead 58 connected to the electrode layer 162.

In one embodiment, the material 146 is a foam. In one embodiment, the material 146 is a conductive foam. In one embodiment, the material 146 is a silver foam. The silver foam may have a purity of greater than about 99.99% and a porosity of more than about 85%. Exemplary embodiments of the silver foam may include: silver foam sold by MTI Corporation, item number MF-AgFom; SV1972 Silver Foam sold by Stanford Advanced Materials; Mepilex Ag Molnlycke 278200 sold by MedOnTheGo.com; Silver Foam Dressing PolyMem MAX manufactured by Ferris Manufacturing; Ferris PolyMem Silver WIC Silver Cavity Wound Filler manufactured by Ferris Manufacturing; or AQUACEL Ag Foam from ConvaTec.

The material 146 may be selected (in terms of size/area of the material) and positioned to extend past the outer edges of the electrode elements 104 or past the outer edges of the electrode layer 162 and may extend to the outer edge of the pad 70a. The extra surface area of the material 146 both in terms of the planar area that may extend beyond the edges of the electrode elements 104 and in terms of the additional surface area provided by the porous cell structure of the material 146, provides a mechanism to dissipate heat from the area of the electrode elements 104 (shown interconnected by flex wires 108 in FIG. 4), and thereby reduce the problem of uncomfortable heat on the patient's skin. This in turn allows the use of more powerful TTFields while remaining within the selected temperature comfortability threshold. Alternatively, the advantage of the inventive construct may be realized in reduced time that the TTFields need to be powered down or turned off and may allow for longer durations of continuous treatment.

In one embodiment, the material 146 is between about 1 mm and about 3 mm thick, such as between about 1 mm and about 2 mm thick. In some embodiments, the material 146 may be greater than 2 mm or lesser than 1 mm. The thickness of the material 146 may be selected, for example, based on a desired compressibility, flexibility, durability, conductivity, and/or stretchability, or some combination thereof.

In one embodiment, the material 146 has a strong biocompatibility and low reactivity with other layers or components of the pad 70a. In one embodiment, the material 146 is comprised of an open-cell foam, whereas, in other embodiments, the material 146 is comprised of a closed-cell foam, or varying amounts of both of open-cell foam and closed-cell foam.

In one embodiment, where the dielectric layer 192 is not present, the material 146 is electrically coupled to the electrode layer 162.

In one embodiment, the gel layer 148 is applied to the material 146. The material 146, having the pockets 150 formed therein, may receive a portion of the gel layer 148 within one or more, or even the majority, of the pockets 150. In another embodiment, the gel layer 148 may be disposed between the material 146 and the electrode layer 162. In one embodiment, the gel layer 148 includes a gel, such as a conductive gel, a hydrogel, or a conductive hydrogel. Alternatively, the gel layer 148 may comprise a conductive adhesive composite.

In one embodiment, the gel layer 148 is disposed on the skin-facing surface 156 of the material 146. In one embodiment, the gel layer 148 is disposed on both surfaces of the layer of material 146. In one embodiment, when the material 146 absorbs or adsorbs the gel layer 148, the gel layer 148 may be considered to be on both the skin-facing surface 156 and the opposite side of the material 146. In one embodiment, the gel layer 148 is embedded into and throughout the material 146. For example, if the material 146 is a nonconductive material, the embedded gel layer 148 may cause the material 146 to be conductive between dielectric layer 192 and the patient's skin, thereby allowing an electric field, such as the TTField, to pass through the non-conductive material. In one embodiment, the gel layer 148 may extend through the material 146 to further contact the dielectric layer 192.

At least some of the pockets 150 that are present on the skin-facing surface 156 may receive a portion of the gel layer 148 within one or more, or even the majority, of the pockets 150 that are present on the skin-facing surface 156. The pockets 150 that are present on the skin-facing surface 156, having been at least partially filled with gel from the gel layer 148, may receive a hair shaft extending from the patient's skin or may further contact the patient's skin.

In one embodiment, the gel layer 148 is between about 0.25-0.50 mm (about 10-20 mils) thick.

Figure 5:
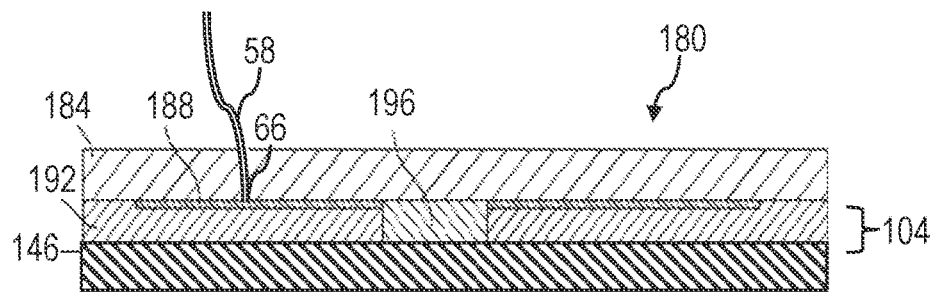
FIG. 5 is a cross-sectional view of an exemplary embodiment of an electrode element constructed in accordance with the present disclosure.

In one embodiment, the electrode layer 162 is in contact with the gel layer 148. In one embodiment, as shown in FIG. 4, the electrode layer 162 is a constituent in the pad 70a such as described above with respect to FIG. 3. In this embodiment, each electrode element 104 is spatially disposed from each other and disposed between the gel layer 148 and the durable topcoat layer 140. A more detailed diagram of an embodiment of the electrode element 104 is shown in FIG. 5.

In one embodiment, the electrode elements 104 of the electrode layer 162 do not include a dielectric layer 192 as described below. In some such embodiments, the electrode elements 104 may be in contact with the material 146. Further, the electrode elements 104 may be in electrical contact with the material 146 such that the material 146 receives the TTField signals from the electric field generator 54.

In one embodiment, the extended pad 100 includes the compression layer 170. The compression layer 170 may be an exterior covering operable to cause a compression between the pad 70a and the patient's skin when the pad 70a is placed on the patient. In one embodiment, the compression layer 170 is a form of clothing, for example, a shirt, an undergarment, or a pants.

In one embodiment, the extended pad 100 further includes a removeable protection layer 176, such as a release liner. The removeable protection layer 176 permits the pad 70a to be constructed separately from the compression layer 170 and placed together at a later time to form the extended pad 100. The step of placing the pad 70a between the material 146 and the compression layer 170 can be accomplished by the patient or healthcare provider at a point of care, or by a manufacturer of the extended pad 100.

In one embodiment, the dielectric layer 192 is provided within the pad 70a. The dielectric layer 192 is constructed of one or more dielectric material and functions as an insulator. In some embodiments, the dielectric layer 192 includes a ceramic material. In other embodiments, the dielectric layer 192 is a flexible polymer.

In some preferred embodiments, the thickness of the dielectric layer 192 is less than 10 µm, and in some preferred embodiments, the thickness of the dielectric layer 192 is less than 5 µm.

Referring now to FIG. 5, shown therein is a cross-sectional view of an exemplary embodiment of an electrode assembly 180 constructed in accordance with the present disclosure. As shown in FIG. 5, the electrode assembly 180 comprises at least one electrode element 104. The electrode element 104 comprises at least one conductor 188, and the dielectric layer 192, and, optionally, may further comprise at least one non-conducting layer 184, as shown in FIG. 5. In one embodiment, the dielectric layer 192 is a high capacitance layer. In one embodiment, the electrode assembly 180 further includes at least one optional opening 196 disposed at least partially therethrough. In one embodiment, the electrode assembly 180 may be constructed as disclosed in U.S. Pat. No. 7,089,054 entitled "Apparatus and Method for Treating a Tumor or the Like", the entire contents of which is hereby incorporated by reference in its entirety. Other components are as described and labelled above.

Figure 6:
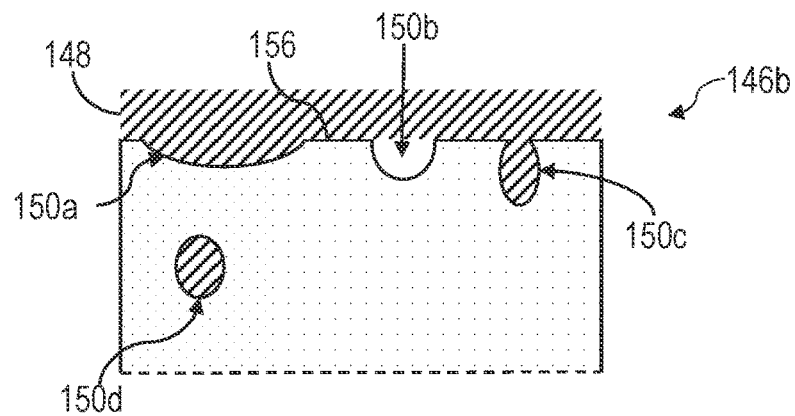
FIG. 6 is a cross-sectional diagram of another exemplary embodiment of a solid continuous phase material constructed in accordance with the present disclosure.

Referring now to FIG. 6, shown therein is a diagram of an exemplary embodiment of the material 146b constructed in accordance with the present disclosure. As discussed above, the material 146b may define the pockets 150 (such as pockets 150a-d) interspersed throughout the material 146b. Each of the pockets 150 may be on a surface of the material 146b such as the skin-facing surface 156 as shown by pockets 150a-c, or internal to the material 146b as shown by pocket 150d. The pockets 150a-c on the skin-facing surface 156 may be partially exposed, such as the pocket 150c, semi-exposed, such as the pocket 150b, or mostly exposed, such as the pocket 150a.

Further shown in FIG. 6 is the gel layer 148 when the gel layer 148 is disposed on the skin-facing surface 156 of the material 146b. As shown, the gel layer 148 may be absorbed or adsorbed by the material 146b such that pockets 150 internal to the material 146b, such as the pocket 150d, are at least partially filled with gel from the gel layer 148. Additionally, the pocket 150a and the pocket 150c are shown as having gel from the gel layer 148. However, in some instances, due to manufacturing or properties of the gel layer 148, not all pockets 150 may be filled with the gel from the gel layer 148 as shown by the pocket 150b. In some cases, one or more pocket 150 may be partially filled by gel from the gel layer 148.

In one embodiment, the gel layer 148 is applied to the material 146b as a liquid gel, such as a liquid hydrogel, and is cured, or polymerized, after it has been applied to the material 146b.

Figure 7:
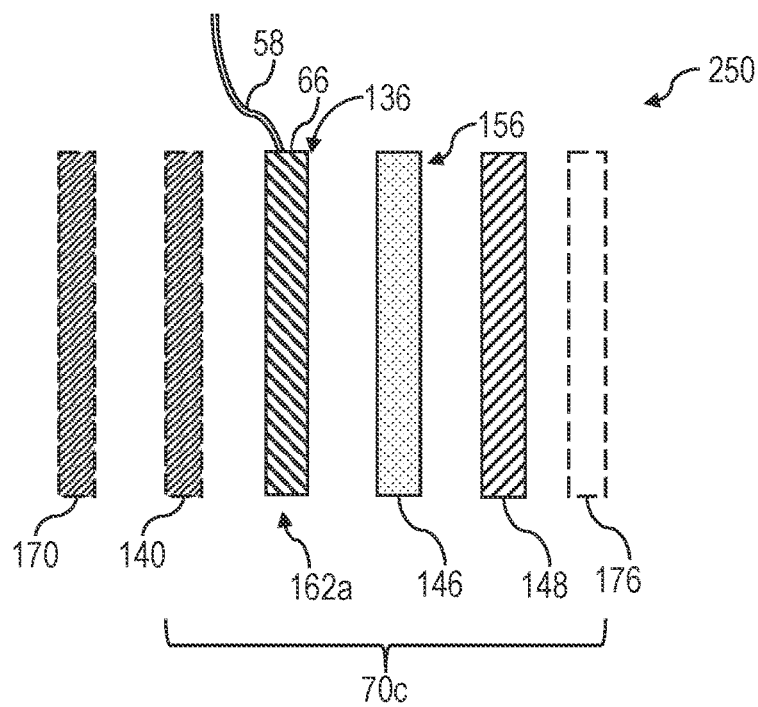
FIG. 7 is a cross-sectional diagram of another exemplary embodiment of a pad constructed in accordance with the present disclosure.

Referring now to FIG. 7, shown therein is a cross section of an exemplary embodiment of an extended pad 250 constructed in accordance with the present disclosure. The extended pad 250 may be constructed similar to the extended pad 100 described above (FIG. 4) with the exception that the extended pad 250 does not include the dielectric layer 192 and the electrode layer 162 formed by the electrode elements 104 is an electrode layer 162a formed by an electrode element 136. Thus, the electrode layer 162a formed by the electrode element 136 is engaged by the material 146. Other components are as described and labelled above.

Figure 8:
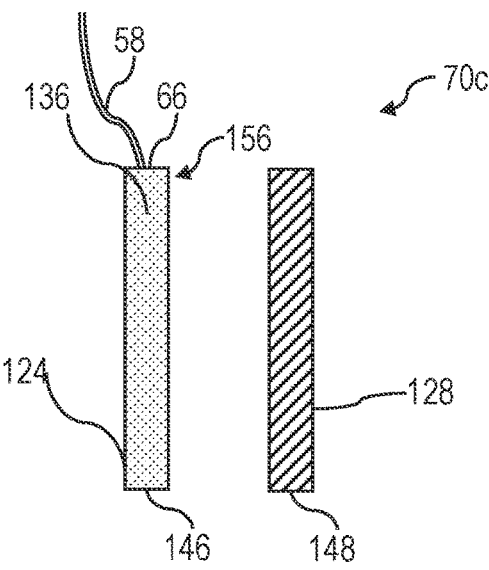
FIG. 8 is a cross-sectional diagram of an exemplary embodiment of a pad constructed in accordance with the present disclosure.

Referring now to FIG. 8, shown therein is a cross-sectional diagram of an exemplary embodiment of a pad 70c constructed in accordance with the present disclosure. The pad 70c and the pad 70d (FIG. 9) generally comprise the second end 66 of the conductive lead 58 connected to the material 146. The pad 70c may be provided with a top 124 and a bottom 128.

In this embodiment, the pad 70c may further include the gel layer 148. As discussed above, the gel layer 148 may be absorbed or adsorbed into the material 146 such that the material 146 includes at least a portion of the gel layer 148 in the pockets 150 (not shown in FIG. 8) within the material 146. Other components are as described and labelled above.

Figure 9:
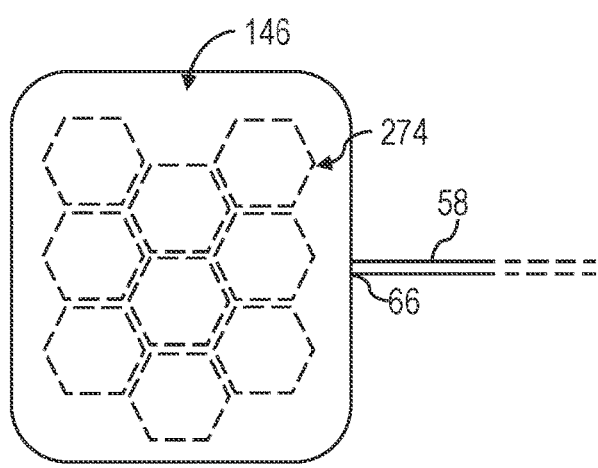
FIG. 9 is a top view of an exemplary embodiment of a pad constructed in accordance with the present disclosure.

Referring now to FIG. 9, shown therein is diagram of a top view of an exemplary embodiment of a pad 70d constructed in accordance with the present disclosure. The pad 70d may be constructed similar to one of the pad 70a, the pad 70b, the pad 100, the extended pad 250, or the pad 70c with the exception that the material 146 is shaped into one or more polygon shape 274. The polygon shape 274 shown in FIG. 9 is shown as a regular, equilateral hexagon, however, in other embodiments, the material 146 may be shaped into other polygons with a fewer or a greater number of sides than six sides. For example, the material 146 may be shaped into a triangle, square, or pentagon, for example. In other embodiments, the polygon shape 274 may be a heptagon, octagon, nonagon, decagon, or other polygon with an even greater number of sides.

In one embodiment, the polygon shape 274 may be repeated one or more times within the pad 70d. In some embodiments, the pad 70d may include a first polygon shape 274 having a first shape and a second polygon shape having a second shape, where the first shape and the second shape are different.

In one embodiment, each polygon shape 274 is spatially disposed and separated from each other by a non-conductive, or dielectric, material. In some embodiments, however, each polygon shape 274 is spatially disposed and separated from each other by a conductive material.

In one embodiment, each electrode element 104 of the pad 70d is disposed within a polygon shape 274. In this embodiment, each electrode element 104 may be disposed at a center of the polygon shape 274 or may be disposed a particular distance from another electrode element 104, or both.

In one embodiment, each polygon shape 274 is sized such that the pad 70d, when placed on a patient's head, contours to that patient's head. Other components are as described and labelled above.

Figure 10:
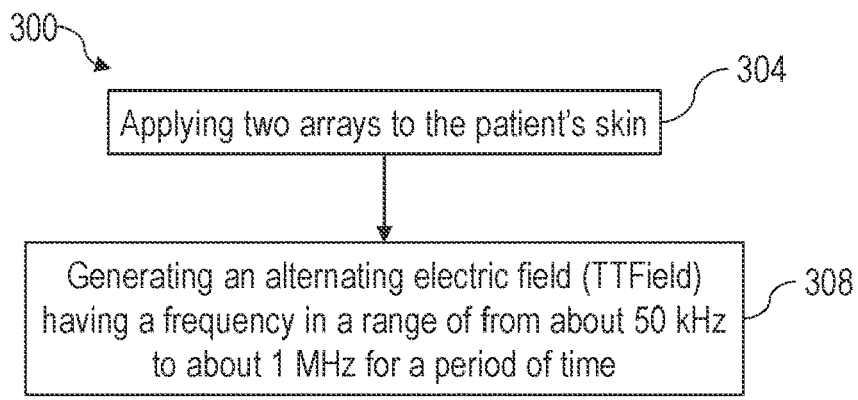
FIG. 10 is a process flow diagram of an exemplary embodiment of a process of using the electronic apparatus to apply a TTField to a patient.

Referring now to FIG. 10, shown therein is an exemplary embodiment of a process 300 of using the apparatus 50 (FIG. 2) to apply a TTField to a patient. The process 300 generally comprises the steps of: applying two pads to the patient's skin (step 304) and generating an alternating electric field (TTField) having a frequency in a range of from about 50 kHz to about 1 MHz for a period of time (step 308).

In one embodiment, the step of applying at least two pads to the patient's skin (step 304) includes applying two or more pads to the patient's skin. In some embodiments, the number of pads 70a, 70b, 100, 250, 70c or 70d applied to a patient's skin is determined by a number needed to apply a TTField having a therapeutic benefit as determined by the user, such as by a medical professional.

In one embodiment, before applying the selected pads to the patient's skin, the patient's skin may need to be cleaned and the hair shafts 312 (FIG. 11) trimmed or shaven.

Figure 11:
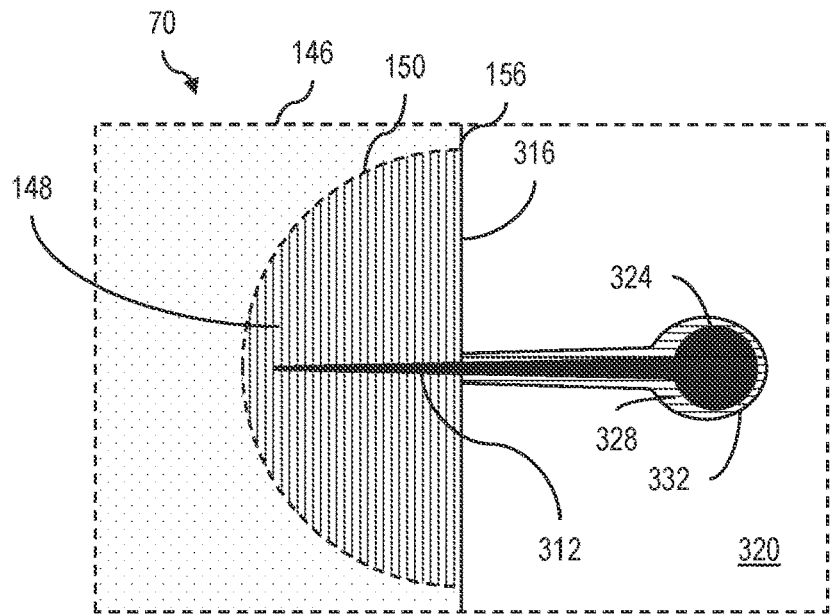
FIG. 11 is a cross-sectional diagram of a portion of another exemplary embodiment applied on the hair shaft extending from a skin surface of a body of a subject.

Referring now to FIG. 11, shown therein is a cross-sectional diagram of a portion of the material 146 of the pad 70. Each of the pockets 150 of the material 146 may be sized and dimensioned so as to receive a hair shaft 312 extending from a skin surface 316 of a body 320 of a subject, the skin surface 316 being capable of hair growth and providing a plurality of hair shafts 312 extending from the skin surface 316. Each of the hair shafts 312 is attached to a hair root 324 positioned within a hair follicle 328 in the body 320 of the subject and intersecting the skin surface 316. The hair follicle 328 has an inner surface 332 disposed toward the hair root 324.

The material 146 may comprise one or more region that makes contact with the skin surface 316 when the pad 70 is applied to the subject's skin. Further, the gel layer 148 positioned within at least some of the pockets 150 may comprise one or more region that makes contact with the skin surface 316 when the pad 70 is applied to the subject's skin.

The skin-facing surface 156 of the material 146 may be disposed toward the skin surface 316 such that at least one hair shaft 312 extending from the skin surface 316 penetrates the gel layer 148 positioned within at least some and preferably many of the pockets 150, thereby securing the pad 70 in place on the skin surface 316 and forming an electrical connection between the gel layer 148 of the pad 70 and the hair shaft 312, and thus the hair root 324 and the inner surface 332 of the hair follicle 328.

Figure 12:
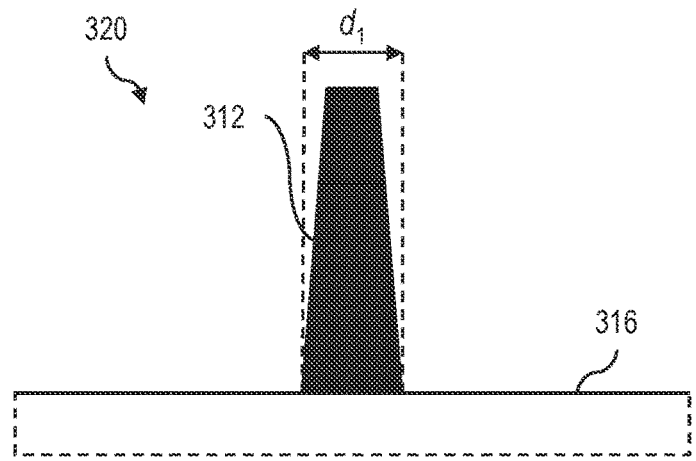
FIG. 12 is a cross-sectional diagram of a hair shaft extending from a skin surface of a body of a subject.

Referring now to FIG. 12, shown therein is a cross-sectional diagram of the hair shaft 312 extending from the skin surface 316 of the body 320 of the subject. Generally, the hair shaft 312 has a cross-sectional distance $d_1$ in a range from about 17 micrometers (about 1/1,500 inch) to about 181 micrometers (about 1/140 inch).

From the above description, it is clear that the inventive concepts disclosed and claimed herein are well adapted to carry out the objects and to attain the advantages mentioned herein, as well as those inherent in the invention. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

Even though particular combinations of features and steps are recited in the claims and/or disclosed in the specification, these combinations are not intended to limit the disclosure. In fact, many of these features and steps may be combined in ways not specifically recited in the claims and/or disclosed in the specification. Although each dependent claim (or illustrative embodiment) listed below may directly depend on only one other claim (or illustrative embodiment), the disclosure includes each dependent claim (or illustrative embodiment) in combination with every other claim (or illustrative embodiment) in the claim set (or listing of illustrative embodiments).

NON-LIMITING ILLUSTRATIVE EMBODIMENTS OF THE INVENTIVE CONCEPT(S)

Illustrative embodiment 1. A system for delivering TTFields to a body of a subject, the system comprising: an electric field generator configured to generate an electrical signal having an alternating current waveform at a frequency in a range from 50 kHz to 1 MHz; a first conductive lead electrically coupled to the electric field generator, the first conductive lead configured to carry the electrical signal; a first pad coupled to the first conductive lead, the first pad having a solid continuous phase material and a conductive gel element, the solid continuous phase material receiving the electrical signal from the first conductive lead, the solid continuous phase material being at least one of constructed of a conductive material or having a conductive material attached, absorbed, or adsorbed to the solid continuous phase material, the solid continuous phase material having a skin-facing surface, and defining a plurality of pockets to intersect the skin-facing surface, at least some of the pockets being present on the skin-facing surface and sized and dimensioned to receive at least one hair shaft extending from the body of the subject, the conductive gel element being attached, absorbed, or adsorbed on the skin-facing surface of the solid continuous phase material and positioned within at least some of the pockets; a second conductive lead electrically coupled to the electric field generator, the second conductive lead configured to carry the electrical signal; and a second pad coupled to the second conductive lead, the second pad receiving the electrical signal from the second conductive lead.

Illustrative embodiment 2. The system of illustrative embodiment 1, wherein the conductive material of the solid continuous phase material includes silver.

Illustrative embodiment 3. The system of illustrative embodiment 1, wherein the first pad further comprises at least one electrode layer and a dielectric layer, the dielectric layer positioned between the at least one electrode layer and the solid continuous phase material.

Illustrative embodiment 4. The system of illustrative embodiment 3, wherein the electrode layer comprises a plurality of spatially disposed electrode elements.

Illustrative embodiment 5. The system of illustrative embodiment 3, wherein the dielectric layer comprises a plurality of spatially disposed dielectric elements.

Illustrative embodiment 6. The system of illustrative embodiment 5, wherein the dielectric elements include a flexible polymer material.

Illustrative embodiment 7. The system of illustrative embodiment 5, wherein the dielectric elements include a ceramic material.

Illustrative embodiment 8. The system of illustrative embodiment 1, wherein the first pad comprises at least one electrode layer electrically coupled with the solid continuous phase material without a dielectric material positioned between the electrode layer and the solid continuous phase material.

Illustrative embodiment 9. The system of illustrative embodiment 8, wherein the electrode layer includes an electrode element in contact with the solid continuous phase material.

Illustrative embodiment 10. The system of illustrative embodiment 8, further comprising a blocking capacitor in circuit with the solid continuous phase material and operable to prevent an occurrence of direct current within the solid continuous phase material.

Illustrative embodiment 11. The system of illustrative embodiment 10, wherein the blocking capacitor is integrated within at least one of the electric field generator and the first conductive lead.

Illustrative embodiment 12. The system of illustrative embodiment 1, further comprising one or more temperature sensor configured to measure a temperature of the first pad.

Illustrative embodiment 13. The system of illustrative embodiment 12, further comprising a control box configured to monitor the one or more temperature sensor and turn off the electric field generator if the temperature exceeds a comfortability threshold.

Illustrative embodiment 14. The system of illustrative embodiment 13, wherein the comfortability threshold is selected to be a value between about 39 degrees Celsius and about 42 degrees Celsius.

Illustrative embodiment 15. The system of illustrative embodiment 1, wherein at least one of the pockets has a largest cross-sectional distance in a range from 17 micrometers to 2 millimeters.

Illustrative embodiment 16. The system of illustrative embodiment 1, wherein at least one of the pockets has a cross-sectional distance greater than 2 millimeters.

Illustrative embodiment 17. The system of illustrative embodiment 1, wherein the solid continuous phase material is a foam.

Illustrative embodiment 18. The system of illustrative embodiment 1, wherein the solid continuous phase material is a fabric.

Illustrative embodiment 19. A pad, comprising: a topcoat layer; a solid continuous phase material supported by the topcoat layer, the solid continuous phase material being at least one of constructed of a conductive material, or having a conductive material attached, absorbed, or adsorbed to the solid continuous phase material, the solid continuous phase material having a skin-facing surface, and defining a plurality of pockets intersecting the skin-facing surface, at least some of the pockets being present on the skin-facing surface and sized and dimensioned to receive at least one hair shaft extending from a body of a subject; and a conductive gel element attached, absorbed, or adsorbed on the skin-facing surface of the solid continuous phase material and positioned within at least some of the pockets.

Illustrative embodiment 20. The pad of illustrative embodiment 19, wherein the solid continuous phase material includes silver.

Illustrative embodiment 21. The pad of illustrative embodiment 19, further comprising at least one electrode layer and a dielectric layer, the dielectric layer positioned between the at least one electrode layer and the solid continuous phase material.

Illustrative embodiment 22. The pad of illustrative embodiment 21, wherein the electrode layer comprises a plurality of spatially disposed electrode elements.

Illustrative embodiment 23. The pad of illustrative embodiment 21, wherein the dielectric layer comprises a plurality of spatially disposed dielectric elements.

Illustrative embodiment 24. The pad of illustrative embodiment 23, wherein the dielectric elements include a flexible polymer material.

Illustrative embodiment 25. The pad of illustrative embodiment 23, wherein the dielectric elements include a ceramic material.

Illustrative embodiment 26. The pad of illustrative embodiment 19, further comprising at least one electrode layer electrically coupled with the solid continuous phase material without a dielectric material positioned between the electrode layer and the solid continuous phase material.

Illustrative embodiment 27. The pad of illustrative embodiment 26, wherein the electrode layer includes an electrode element in contact with the solid continuous phase material.

Illustrative embodiment 28. The pad of illustrative embodiment 19, wherein at least one of the pockets has a cross-sectional distance in a range from 17 micrometers to 2 millimeters.

Illustrative embodiment 29. The pad of illustrative embodiment 19, wherein at least one of the pockets has a cross-sectional distance greater than 2 millimeters.

Illustrative embodiment 30. The system of illustrative embodiment 19, wherein the solid continuous phase material is a foam.

Illustrative embodiment 31. The system of illustrative embodiment 19, wherein the solid continuous phase material is a fabric.

Illustrative embodiment 32. A method, comprising: applying at least two conductive regions to an area of a skin of a patient, the area of skin being capable of hair growth and providing a plurality of hair shafts extending from the skin of the patient, each conductive region having a solid continuous phase material and a conductive gel element so as to supply an electrical current from the solid continuous phase material to the conductive gel element, the solid continuous phase material being at least one of constructed of a conductive material or having a conductive material attached, absorbed, or adsorbed to the solid continuous phase material, the solid continuous phase material having a skin-facing surface, and defining a plurality of pockets intersecting the skin-facing surface, at least some of the pockets being present on the skin-facing surface and receiving at least one hair shaft extending from the skin of the patient, the conductive gel element attached, absorbed, or adsorbed on the skin-facing surface of the solid continuous phase material, the conductive gel element being at least one of capacitively coupled and electrically coupled with the at least one hair shaft in the skin of the patient.

Illustrative embodiment 33. The method of illustrative embodiment 32, wherein at least some of the pockets have a cross-sectional distance in a range from 17 micrometers to 2 millimeters.

Illustrative embodiment 34. The method of illustrative embodiment 32, wherein at least one of the pockets has a cross-sectional distance greater than 2 millimeters.

Illustrative embodiment 35. The method of illustrative embodiment 32, further comprising the step of coupling the conductive regions to an electric field generator before or after applying the at least two conductive regions to the patient, the electric field generator configured to generate an electrical signal having an alternating current waveform at frequencies in the range from 50 kHz to 1 MHz.

Illustrative embodiment 36. The method of illustrative embodiment 35, wherein the solid continuous phase material within the at least two conductive regions is electrically coupled to the electric field generator and, upon receiving the electrical signal, supplies electrical current to the conductive gel element.

Illustrative embodiment 37. The method of illustrative embodiment 36, further comprising the step of activating the electric field generator to supply the electrical signal to the conductive regions, thereby supplying electrical current to the patient through the conductive gel element.

Illustrative embodiment 38. The method of illustrative embodiment 32, wherein the solid continuous phase material is a foam.

Illustrative embodiment 39. The method of illustrative embodiment 32, wherein the solid continuous phase material is a fabric.

What is claimed is:

1. A system for delivering Tumor Treating Fields (TTFields) to a body of a subject, the system comprising:
   an electric field generator configured to generate an electrical signal having an alternating current waveform at a frequency in a range from 50 kHz to 1 MHz;
   a first conductive lead electrically coupled to the electric field generator, the first conductive lead configured to carry the electrical signal;
   a first pad coupled to the first conductive lead, the first pad having a solid continuous phase material and a conductive gel element, the solid continuous phase material receiving the electrical signal from the first conductive lead, the solid continuous phase material being at least one of constructed of a conductive material or having a conductive material attached, absorbed, or adsorbed to the solid continuous phase material, the solid continuous phase material having a skin-facing surface, and defining pockets to intersect the skin-facing surface, at least some of the pockets being present on the skin-facing surface and sized and dimensioned to receive at least one hair shaft extending from the body of the subject, the conductive gel element being attached, absorbed, or adsorbed on the skin-facing surface of the solid continuous phase material and positioned within at least some of the pockets;
   a second conductive lead electrically coupled to the electric field generator, the second conductive lead configured to carry the electrical signal; and
   a second pad coupled to the second conductive lead, the second pad receiving the electrical signal from the second conductive lead.

2. The system of claim 1, wherein the conductive material of the solid continuous phase material is selected from one or more of silver, copper, tin, aluminum, titanium, platinum, carbon, an alloy thereof, and/or some combination thereof.

3. The system of claim 1, wherein the first pad further comprises at least one electrode layer and a dielectric layer, the dielectric layer positioned between the at least one electrode layer and the solid continuous phase material.

4. The system of claim 1, further comprising at least one electrode layer electrically coupled with the solid continuous phase material without a dielectric material positioned between the electrode layer and the solid continuous phase material.

5. The system of claim 1, wherein at least one of the pockets has a largest cross-sectional distance in a range from 17 micrometers to 2 millimeters.

6. The system of claim 1, wherein at least one of the pockets has a cross-sectional distance greater than 2 millimeters.

7. The system of claim 1, wherein the solid continuous phase material is a foam.

8. A pad, comprising:
   a topcoat layer;
   a solid continuous phase material supported by the topcoat layer, the solid continuous phase material being at least one of constructed of a conductive material, or having a conductive material attached, absorbed, or adsorbed to the solid continuous phase material, the solid continuous phase material having a skin-facing surface, and defining a plurality of pockets intersecting the skin-facing surface, at least some of the pockets being present on the skin-facing surface and sized and dimensioned to receive at least one hair shaft extending from a body of a subject; and
   a conductive gel element attached, absorbed, or adsorbed on the skin-facing surface of the solid continuous phase material and positioned within at least some of the pockets.

9. The pad of claim 8, wherein the conductive material of the solid continuous phase material is selected from one or more of silver, copper, tin, aluminum, titanium, platinum, carbon, an alloy thereof, and/or some combination thereof.

10. The pad of claim 8, further comprising at least one electrode layer and a dielectric layer, the dielectric layer positioned between the at least one electrode layer and the solid continuous phase material.

11. The pad of claim 8, further comprising at least one electrode layer electrically coupled with the solid continuous phase material without a dielectric material positioned between the electrode layer and the solid continuous phase material.

12. The pad of claim 11, wherein the electrode layer includes an electrode element in contact with the solid continuous phase material.

13. The pad of claim 8, wherein at least one of the pockets has a cross-sectional distance in a range from 17 micrometers to 2 millimeters.

14. The pad of claim 8, wherein at least one of the pockets has a cross-sectional distance greater than 2 millimeters.

15. The pad of claim 8, wherein the solid continuous phase material is a foam.

16. A method, comprising:
applying at least two conductive regions to an area of a skin of a patient, the area of skin being capable of hair growth and providing a plurality of hair shafts extending from the skin of the patient, each conductive region having a solid continuous phase material and a conductive gel element so as to supply an electrical current from the solid continuous phase material to the conductive gel element, the solid continuous phase material being at least one of constructed of a conductive material or having a conductive material attached, absorbed, or adsorbed to the solid continuous phase material, the solid continuous phase material having a skin-facing surface, and defining pockets intersecting the skin-facing surface, at least some of the pockets being present on the skin-facing surface and receiving at least one hair shaft extending from the skin of the patient, the conductive gel element attached, absorbed, or adsorbed on the skin-facing surface of the solid continuous phase material, the conductive gel element being at least one of capacitively coupled and electrically coupled with the at least one hair shaft in the skin of the patient.

17. The method of claim 16, wherein at least some of the pockets have a cross-sectional distance in a range from 17 micrometers to 2 millimeters.

18. The method of claim 16, further comprising the step of coupling the conductive regions to an electric field generator before or after applying the at least two conductive regions to the patient, the electric field generator configured to generate an electrical signal having an alternating current waveform at frequencies in a range from 50 kHz to 1 MHz.

19. The method of claim 18, wherein the solid continuous phase material within the at least two conductive regions is electrically coupled to the electric field generator and, upon receiving the electrical signal, supplies electrical current to the conductive gel element.

20. The method of claim 16, wherein the solid continuous phase material is a foam.

\* \* \* \* \*